May 25, 1926.
J. B. OLSON
1,585,910
FEEDER FOR FOWLS
Filed May 21, 1924
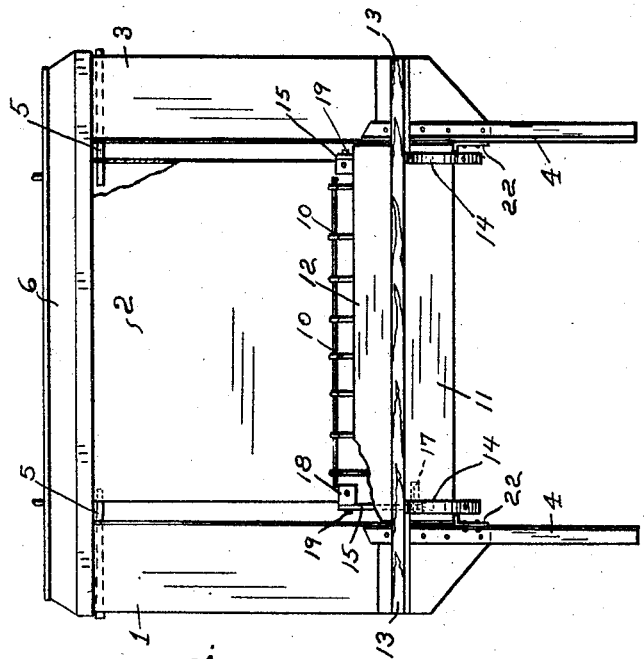
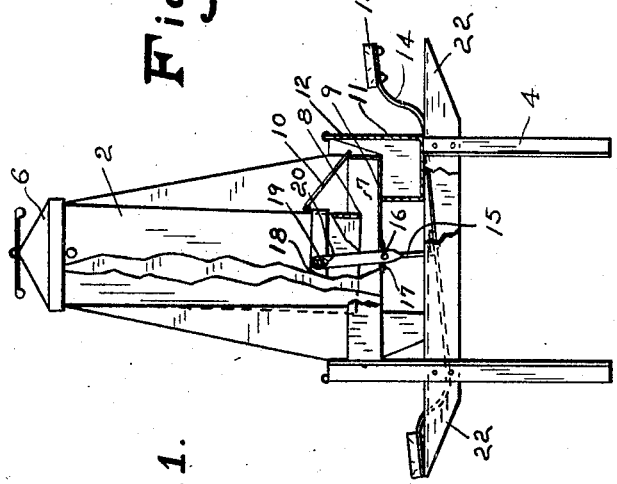
INVENTOR.
John B. Olson
BY
ATTORNEYS Patented May 25, 1926.

1,585,910

UNITED STATES PATENT OFFICE.

JOHN B. OLSON, OF FORT ATKINSON, WISCONSIN, ASSIGNOR TO JAMES MFG. COMPANY, OF FORT ATKINSON, WISCONSIN, A CORPORATION OF WISCONSIN.

FEEDER FOR FOWLS.

Application filed May 21, 1924. Serial No. 714,766.

My invention relates to improvements in feeders for fowls.

The object of this invention is to provide improved means for utilizing the weight of the fowls to regulate deliveries of feed from an inclosure into a feeding trough or receptacle.

More particularly stated it is the object of my invention to provide means, whereby the weight of a fowl may be utilized to shift the container in such a manner as to promote downward movement of the contents into a feeding receptacle, the latter being so located as to limit the quantity thus delivered.

In the drawings:

Figure 1 is an end elevation, partly in vertical section, of a chicken feeder embodying my invention.

Figure 2 is a side elevation of the same, with one wall partially broken away.

Like parts are identified by the same reference characters throughout both views.

The drawings illustrate a chicken feeder having three compartments, 1, 2 and 3, respectively. The end compartments 1 and 3 are relatively fixed, being supported in fixed relation to the legs 4. The central compartment is suspended upon trunnions 5 mounted in the walls of the compartments 1 and 3, respectively, and projecting inwardly into engagement with the end walls of the central compartment 2, with their axes substantially in the central longitudinal and normally vertical plane of compartment or hopper 2. The three compartments are normally closed by a removable cap 6.

The lower end of the compartment 2 is open as clearly shown in Figure 1. It extends into a feeding pan or receptacle 7. The distance between the lower margin 8 of the hopper and the bottom 9 of the pan 7 regulates delivery of the contents of the hopper 2 into the pan by allowing the accumulations of material in the pan to block delivery through the open and lower end of the hopper. Wire guards or fingers 10 are pivoted to the sides of the hopper and extend downwardly and outwardly over the upper margins of the pan 7 to limit lateral movements of the fowls or swinging of their necks while feeding. Catch pans 11 have raised walls 12 spaced from the side walls of the feeding pan. The guards 10 and catch pans 11 form no part of the present invention and more particular description thereof is deemed unnecessary.

Perches 13 are supported by arms 14 from a set of levers 15 which may be pivotally connected at 16 to any suitable support. In the construction shown the levers 15 are pivotally connected to brackets 17 secured to the bottom of the pan 7. They extend upwardly at the respective ends of the pan and are loosely connected to the respective end walls of the hopper 2 by brackets 18 and trunnions 19. The trunnions project loosely through slots 20 in the ends of the levers.

In operation, one or the other of the perches 13 are ordinarily in a raised position with the other perch simultaneously resting upon the cross bars 22 of the frame. Assuming the parts to be in the position in which they are shown in Figure 1, it will be obvious that the weight of a fowl on the raised perch 13 will tend to depress that perch into contact with the cross bar 22. In so doing, the lower end of the lever 15 will be swung to the left; the upper end of the lever, above the pivot 16, will be swung to the right, thereby swinging the lower end of the hopper 2 to the right, the guards 10 sliding freely upon the upper margins of the side walls of the pan 7. The movement of the lower end of the hopper 2 toward the right will tend to relieve the contents of the hopper from any support, such as might otherwise be received from the material previously delivered into the pan. The fowls tend to reach under the hopper and abstract the feed irregularly, so that it may be substantially all removed from one feeding space between two fingers 10 although supporting masses may remain at other points. The swinging movement of the hopper 2 tends to distribute the feed in the pan and to break the support afforded by any such massed material. It also tends to slightly jar the contents of the hopper 2 and thus promote downward movement of the material.

Subsequently, after the fowl mounts the left-hand perch the hopper 2 will be swung in the opposite direction, spreading the material previously delivered and causing a further delivery of the contents into the pan.

I claim:

1. In a feeder for fowls, the combination with a support, of a feed pan, and a feed container suspended for oscillation and provided with a delivery outlet in an oscillatory portion in close proximity above the pan, a perch mounted for movement under the weight of a fowl, and connections adapted to transmit the movement of the perch to swing the container.

2. The combination with a pivotally suspended container having an open bottom, of a receptacle extending underneath said open bottom to support material in an obstructing position with reference thereto, means for supporting fowls in a position to obtain food from said receptacle and means for utilizing the weight of a fowl, when in position for feeding, to move the pivotally suspended container.

3. In a feeder for fowls, the combination with a pivotally supported feeding container having an open bottom, a feed receptacle having an open top adapted to receive material from the container, a frame supporting the container and feeding receptacle in a raised position with the container over the central portion of said receptacle, a set of levers having relatively stationary pivotal supports and loosely connected with the lower portion of the container to oscillate the latter, and a perch connected with the lower ends of said levers and laterally offset therefrom, whereby the weight of a fowl on the perch may be utilized to actuate said levers and container.

4. In a feeder for fowls, the combination with a support, of a feeding container pivotally connected with said support, an associated feeding receptacle connected with the support in a position to receive material from said container, and a set of levers each having one end loosely connected with the container and the other end connected with a perch, said levers being adapted to utilize the weight of a fowl on a perch to move the container.

5. In a feeder for fowls, the combination with a support, of a feed container pivotally connected with the support, a perch, a set of levers yieldingly supporting the perch, and connections for utilizing movements of said perch and levers to oscillate the container and promote delivery and distribution of material therefrom.

6. In a feeder for fowls the combination with a support, of a container pivotally connected therewith and having an open bottom, a set of levers loosely connected with the container and having fulcrum connection with the support, a set of perches connected with said levers on opposite sides thereof to swing downwardly and upwardly in alternation, and means connected with the support for limiting the downward movement of the respective perches, said perches when raised being adapted to utilize the weight of a fowl thereon to press the same and transmit the resultant motion through the levers to the container to promote delivery and distribution of the material therefrom.

7. In a feeder for fowls, the combination with an oscillatory feeding container having an open bottom, means for partially obstructing delivery of material from the container through said open bottom, a set of oscillatory perches, connected for limited and alternative movement in a vertical plane, and connections for transmitting the movements of the perches to oscillate said container and promote limited delivery and distribution of material therefrom.

8. In a feeder, the combination of a pivotally supported feed container having an outlet port in an oscillatory portion thereof, and means for utilizing the weight of a fowl to move the container whereby to distribute along a horizontal path material issuing from said port, said means comprising a pivotally mounted roost and actuating connections between said roost and movable portion of said receptacle.

9. In a device of the character described, the combination with a feed delivery member having a discharge portion supported for movement traversing a horizontal surface, of means for moving said member to traverse such a surface whereby to distribute across said surface material issuing from said member, said means comprising a yieldable support in operative proximity to said surface, whereby an animal upon said support may reach and eat material so distributed.

10. In a device of the character described, the combination with a set of upright legs and a food supporting surface mounted thereon, of an oscillatory feed receptacle having a discharge portion arranged for movement across the said surface, means connected with said legs for pivotally supporting said receptacle, a pivotally mounted roost operatively connected with said receptacle for the oscillation thereof, and a stop connected with said legs and arranged to limit the downwardly movement of said roost under the weight of a fowl, said roost being operatively associated with said surface in such a manner that a fowl standing on said roost can reach food on said surface.

11. In a device of the character described, the combination with a support and a pivotally suspended receptacle having an oscillatory discharge portion, of a pan arranged imediately beneath said portion to receive material issuing therefrom, roosts extending along opposite sides of said pan, a lever carrying said roosts and operatively connected with said receptacle for the oscillation thereof, and stop means carried by said support and operatively associated with each of said roosts to limit the downward movement thereof.

12. In a device of the character described, the combination with a support providing a feed supporting surface, of a pivotally suspended receptacle having a discharge portion oscillatory with respect to said surface, levers in pivotal connection with said support and with said receptacle, and roosts rigidly connected with said levers upon either side of said surface and laterally offset in opposite directions from the point of pivotal connection of said levers with said support, whereby the weight of a fowl on said roosts will tend to move said levers and said receptacle.

JOHN B. OLSON.